(12) United States Patent
Wu

(10) Patent No.: US 8,050,412 B2
(45) Date of Patent: Nov. 1, 2011

(54) SCALING ADJUSTMENT TO ENHANCE STEREO SEPARATION

(75) Inventor: David Chaohua Wu, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1727 days.

(21) Appl. No.: 11/011,565

(22) Filed: Dec. 14, 2004

(65) Prior Publication Data

US 2005/0094820 A1 May 5, 2005

Related U.S. Application Data

(63) Continuation of application No. 10/083,201, filed on Feb. 26, 2002, now Pat. No. 6,832,078.

(51) Int. Cl.
| | |
|---|---|
| *H04H 20/47* | (2008.01) |
| *H04H 20/48* | (2008.01) |
| *H04H 20/49* | (2008.01) |
| *H03G 7/00* | (2006.01) |

(52) U.S. Cl. .................... 381/2; 381/3; 381/15; 381/16; 381/106

(58) Field of Classification Search .................. 381/2, 6, 381/13, 15–16, 97, 106, 20–22; 455/337, 455/237.1
See application file for complete search history.

(56) References Cited

U.S. PATENT DOCUMENTS

| | | | |
|---|---|---|---|
| 6,037,993 A | 3/2000 | Easley | |
| 6,118,879 A * | 9/2000 | Hanna | ........................... 381/106 |
| 6,122,380 A | 9/2000 | Pedlow, Jr. | |
| 6,259,482 B1 | 7/2001 | Easley et al. | |
| 6,281,813 B1 | 8/2001 | Vierthaler et al. | |
| 6,295,362 B1 | 9/2001 | Zhang | |
| 6,492,913 B2 | 12/2002 | Vierthaler et al. | |
| 6,535,608 B1 | 3/2003 | Taira | |
| 6,552,753 B1 | 4/2003 | Zhurbinskiy et al. | |
| 6,608,902 B1 | 8/2003 | Jackson et al. | |
| 6,664,849 B1 | 12/2003 | Taura et al. | |
| 6,859,238 B2 | 2/2005 | Wu | |
| 2003/0091194 A1 | 5/2003 | Teichmann et al. | |
| 2003/0160905 A1 | 8/2003 | Wu | |
| 2003/0162517 A1 | 8/2003 | Wu | |

FOREIGN PATENT DOCUMENTS

| | | |
|---|---|---|
| EP | 0 251 703 | 1/1988 |
| JP | 05118415 | 5/1993 |
| JP | 06334618 | 2/1994 |

OTHER PUBLICATIONS

European Search Report, Oct. 7, 2004.
OET Bulletin No. 60, Revision A: "Multichannel Television Sound Transmission and Audio Processing Requirements for the BTSC System" Feb. 1986, Office of Engineering and Technology, XP002298198.

\* cited by examiner

*Primary Examiner* — Devona E. Faulk
*Assistant Examiner* — George Monikang
(74) *Attorney, Agent, or Firm* — McAndrews, Held & Malloy, Ltd.

(57) ABSTRACT

A demodulator (10) converts television signals to video baseband signals and audio baseband signals including stereo signals representing a right channel signal value and a left channel signal value. A DSP (60) recursively finds a preferred coefficient value for a scaling that reduces stereo separation due to amplitude variation of the right and left channel signal values. The preferred coefficient value is thereafter used for scaling the right and left channel signal values.

9 Claims, 4 Drawing Sheets

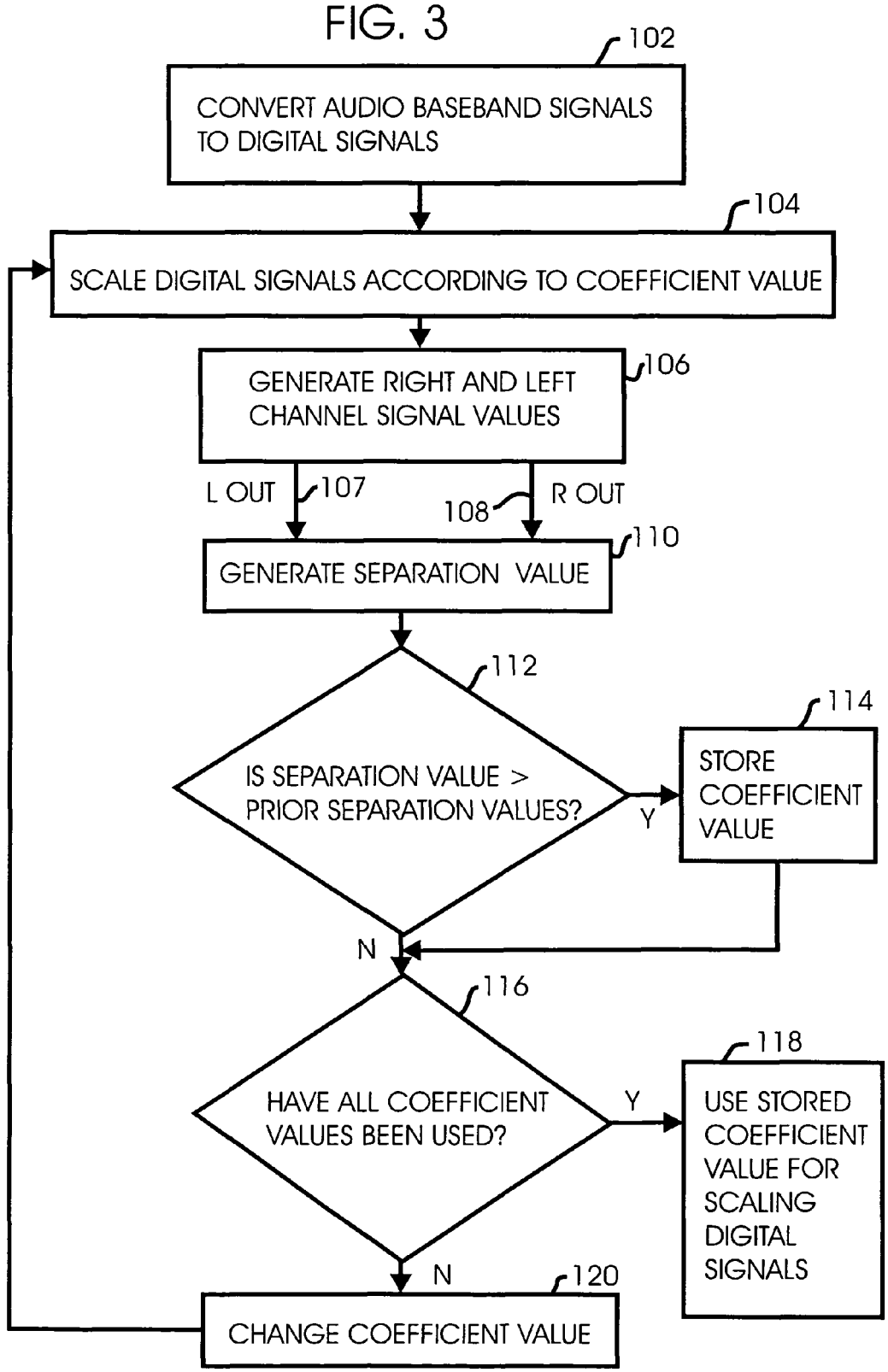

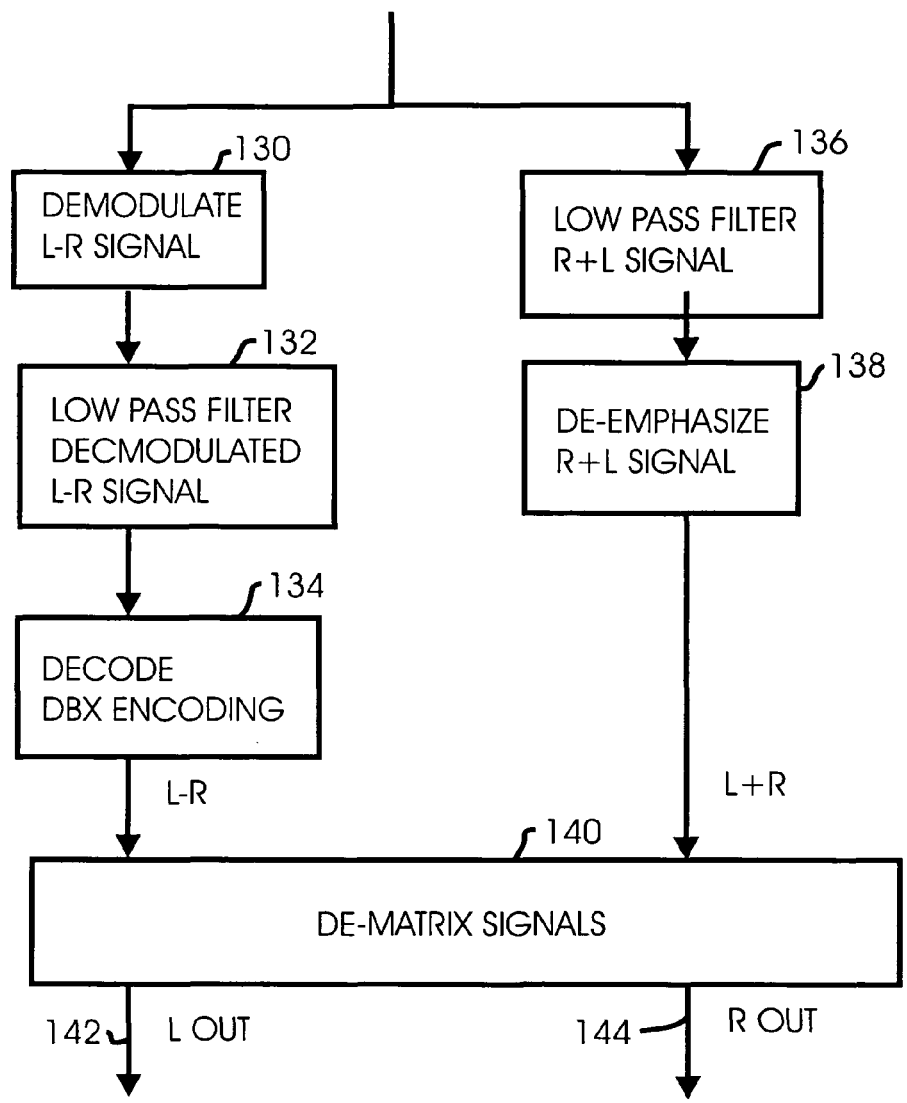

SCALING ADJUSTMENT TO ENHANCE STEREO SEPARATION

CROSS REFERENCE TO RELATED APPLICATION

The present application is a continuation of co-pending application U.S. Ser. No. 10/083,203, filed on Feb. 26, 2002.

BACKGROUND OF THE INVENTION

This invention relates to decoding audio signals and more particularly relates to adjustment of decoding to enhance stereo separation.

During the 1980s, the FCC adopted the BTSC format as a standard for multichannel television sound (MTS). Typically, the BTSC format is used with a composite TV signal that includes a video signal, as well as the BTSC format for sound reproduction.

The BTSC format is similar to FM stereo, but has the ability to carry two additional audio channels. Left plus right channel mono information is transmitted in a way similar to stereo FM in order to ensure compatibility with monaural television receivers. A 15.734 KHz pilot signal is used, instead of the FM stereo 19 KHz pilot signal, which allows the pilot signal to be phase-locked to the horizontal line frequency. A double sideband-suppressed carrier at twice the frequency of the pilot transmits the left minus right stereo information. The stereo information is dbx encoded to aid in noise reduction. An SAP channel is located at 5 times the pilot frequency. The SAP channel may be used for second language or independent source program material. A professional audio channel may be added at 6.5 times the plot frequency in order to accommodate additional voice or data.

Stereo tuners and demodulator units capable of decoding the BTSC format have been on the market for some time. The front end of the units typically includes analog components or integrated circuit chips that cause variation in the amplitude of the composite signal, including the BTSC portion of the signal. This variation in amplitude reduces stereo separation of the right and left channel information carried in the composite signal. This invention addresses the problem and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One method embodiment of the invention is useful in a demodulator suitable for converting television signals to video baseband signals and audio baseband signals including stereo signals representing a right channel signal value and a left channel signal value. In such an environment, stereo separation is improved by providing steps comprising converting at least the audio baseband signals to corresponding digital signals. The digital signals are scaled according to at least one coefficient having a series of different coefficient values. In response to the digital signals scaled according to the series of coefficient values, a series of first digital signals corresponding to the right channel signal value are generated. In response to the digital signals scaled according to the series of coefficient values, a series of second digital signals corresponding to the left channel signal value are generated. A series of separation signals representing the stereo separation represented by the series of first digital signals and the series of second digital signals also are generated. The separation signal representing the largest stereo separation is stored as a preferred coefficient value. The digital signals are scaled according to the preferred coefficient value.

According to one apparatus embodiment of the invention, a computer readable medium is encoded with a computer program which when executed by a computer enables improved stereo separation of stereo signals representing a right channel signal value and a left channel signal value converted to corresponding digital signals. The computer program causes the computer to perform a method comprising:

scaling the digital signals according to at least one coefficient having a series of different coefficient values;
 generating in response to the digital signals scaled according to the series of coefficient values a series of first digital signals corresponding to the right channel signal value;
 generating in response to the digital signals scaled according to the series of coefficient values a series of second digital signals corresponding to the left channel signal value;
 generating a series of separation signals representing the stereo separation represented by the series of first digital signals and the series of second digital signals;
 storing the separation signal representing the largest stereo separation as a preferred coefficient value; and
 scaling the digital signals according to the preferred coefficient value.

By using the foregoing techniques, the stereo separation can be conveniently maintained with a degree of precision previously unattained.

These and other advantages and novel features of the present invention, as well as details of an illustrated embodiment thereof, will be more fully understood from the following description and drawings.

BRIEF DESCRIPTION OF THE DRAWINGS

FIG. 3 is a flow diagram illustrating steps performed by the DSP shown in FIG. 1.

FIG. 4 is a flow diagram illustrating in more detail one of the steps shown in FIG. 3.

DETAILED DESCRIPTION OF THE INVENTION

Figure 1:
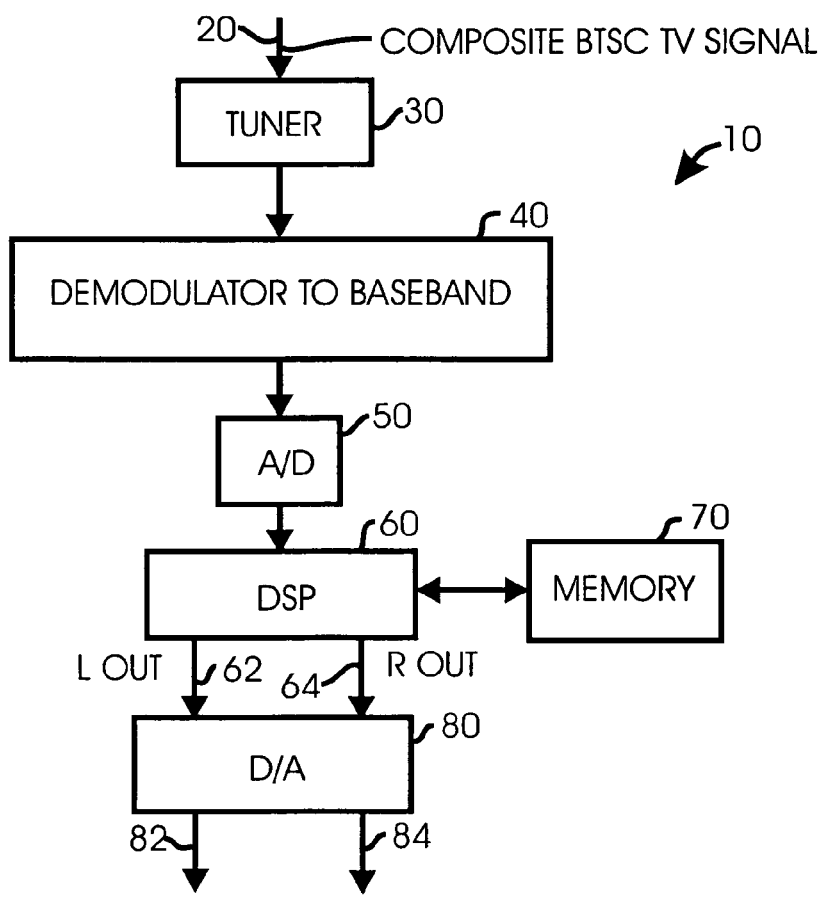
FIG. 1 is a schematic diagram of one form of a demodulator made in accordance with the invention, including a digital signal processor (DSP).

Referring to FIG. 1, a demodulator 10 made in accordance with one form of the invention includes an input path 20 that receives an analog composite TV signal that comprises a video signal, as well as a BTSC format stereo signal that has been frequency modulated on a carrier signal. The BTSC format stereo signal includes signals representing a right channel signal value and a left channel signal value.

A tuner 30 tunes the demodulator to the carrier signal. A demodulator 40 demodulates the analog composite TV signal to analog baseband signals, including the BTSC format stereo signal.

An analog to digital converter (A/D) 50 converts the analog BTSC format signals to corresponding digital signals. A/D 50 samples at a rate of 316.406 KHz.

A digital signal processor (DSP) 60 receives the digital signals and operates on them by executing algorithms stored in a memory 70.

The DSP generates a signal corresponding to the left stereo channel on an output port 62 and generates a signal corresponding to the right stereo channel on an output port 64. The digital signal on ports 62 and 64 are processed by a digital to analog (D/A) converter 80 in order to generate an analog left channel signal on a path 82 and to generate an analog right channel signal on a path 84.

Figure 2:
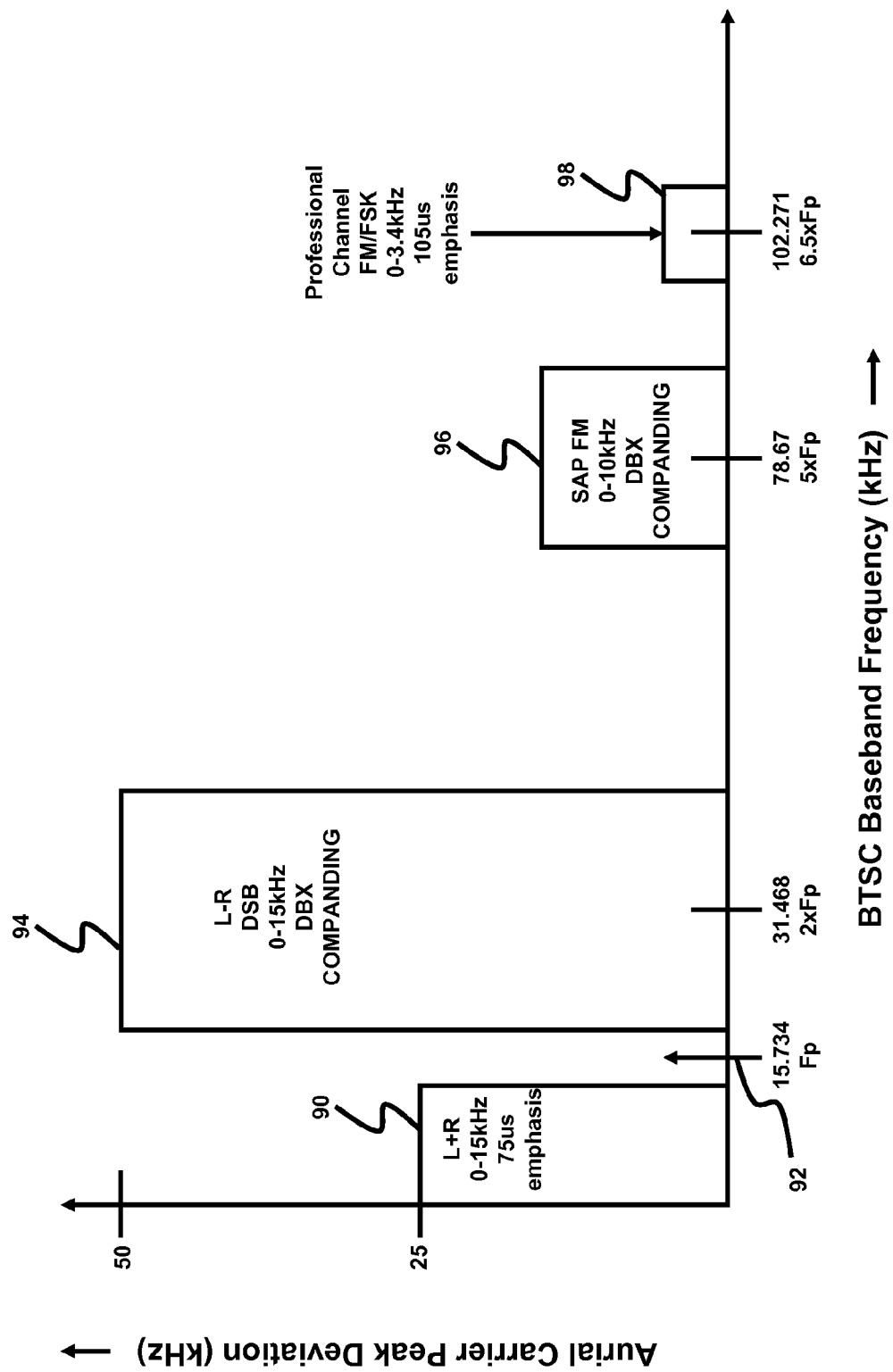
FIG. 2 is a diagram illustrating the BTSC signal frequency format.

The baseband BTSC component of the composite TV signal generated by demodulator 40 is illustrated in FIG. 2. A frequency band 90 from 0-15 KHz carries the sum of the left and right stereo channel signals (the L+R signal). A pilot signal 92 is carried at 15.734 KHz. A frequency band 94 centered at twice the pilot signal frequency carries the difference between the left and right stereo channel signals (the L−R signal). A frequency band 96 centered at five times the pilot signal frequency carries an SAP signal. A frequency band 98 centered at 6.5 times the frequency of the pilot signal carries a professional channel.

FIG. 3 is a flow chart illustrating one step performed by A/D 50 and various operations performed by DSP 60 by executing one of the algorithms stored in memory 70. At the beginning of operations, various coefficient values are stored in memory 70. For example, 30 different values may be stored. In a step 102, A/D 50 converts analog BTSC format audio signals to corresponding digital signals. In a step 104, DSP 60 scales the digital signals corresponding to the amplitude of L+R signal and the amplitude of the L−R signal according to a coefficient value. The scaling may be carried out by a multiplication function. The coefficient value determines the factor by the which the amplitudes of the L+R and L−R signals are multiplied. The coefficient value is stored in memory 70.

In a step 106, in response to the digital signals scaled in step 104, DSP 60 generates a first digital signal 107 corresponding to the left channel signal value (the L signal value) and generates a second digital signal 108 corresponding to the right channel signal value (the R signal value). Step 106 is illustrated in more detail in FIG. 4. In general, generating the right and left channel signal values is carried out by decoding the L+R signal and decoding the L−R signal.

In a step 110, DSP 60 generates a separation value that represents the stereo separation represented by the digital signals 107 and 108. The separation signal may be generated, for example, by calculating the ratio of the L signal value and the R signal value. The L signal value and the R signal value represent the amplitude of the left and right stereo channels.

In a step 112, DSP 60 determines whether the separation value obtained in step 110 is greater than any prior separation value obtained in prior cycles of operation. If the answer to step 112 is affirmative, the coefficient value resulting in the greater separation value is stored in memory 70 in a step 114. The program then advances to step 116. If the answer to step 112 is negative, the program also enters step 116, which determines whether all the different coefficient values stored in memory 70 have been used. If the answer to step 116 is affirmative, in a step 118, the coefficient value stored in step 114 is stored in memory 70 as a preferred coefficient value that is thereafter used to scale digital signals during subsequent operations of demodulator 10. If the answer to step 116 is negative, in a step 120, the next stored coefficient value stored in memory 70 is used as the coefficient value for scaling digital signals in accordance with step 104. The program then loops back to step 104.

For purposes of determining the preferred coefficient value as described in connection with step 118, the composite signal received on path 20 may be a test TV signal in which the right channel signal has a zero value, or the left signal channel has a zero value. More specifically, a test tone may be injected to the left channel only in the encoder, and then the coefficient values are varied as shown in FIG. 3 until the best stereo separation is obtained (e.g., by use of the preferred coefficient value). The preferred coefficient value is stored in memory 70 and then is used for the regular decoding process. In one application, the input scaling error is around plus or minus 20%; the scaling variation range to search for the best coefficient is plus or minus 30% with 2% incremental steps. For one application, a test tone of 3 KHz and an amplitude larger than 30% modulation is used.

Additional details about the algorithms stored in memory 70 are described in the following applications filed on the same day as this application and incorporated by reference in their entirety: "System and Method of Performing Digital Multi-Channel Audio Signal Decoding," filed under docket number 13578US01; System and Method for SAP FM Demodulation," filed under docket number 13586US01; "Method and Apparatus of Performing Sample Rate Conversion of a Multi-Channel Audio Signal," filed under docket number 13587US01 and "Scaling Adjustment Using Pilot Signal," filed in the name of David Wu under docket number 13589US01.

Memory 70 comprises a computer readable medium encoded with a computer program which when executed by DSP 60 causes DSP 60 to perform the steps shown in FIGS. 3 and 4. The computer program may be stored on other readable medium, such as magnetic media, including floppy disks, and optical media, including CD-ROMs and DVD disks.

Referring to FIG. 4, step 106 of FIG. 3 includes a step 130 in which DSP 60 demodulates the L−R signal, a step 132 in which DSP 60 low pass filters the demodulated L−R signal, and a step 134 in which DSP 60 decodes the dbx encoding of the L−R signal.

Still referring to FIG. 4, step 106 of FIG. 3 also includes a step 136 in which DSP 60 low pass filters the L+R signal and a step 138 in which DSP 60 de-emphasizes the L+R signal. (Emphasis is used to reduce noise in the composite TV signal. De-emphasis is performed to restore the original wave shape of the signal before emphasis.)

In a step 140, DSP 60 performs a de-matrix operation on the L−R signal and the L+R signal in order to generate a left channel digital signal 142 and a right channel digital signal 144. Any mismatch in the amplitude of the right and left channel digital signals causes loss of stereo separation. However, due to the use of the preferred coefficient value obtained in steps 114 and 118, any loss of separation is reduced.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A demodulator suitable for converting a multi-channel signal comprising:

an analog-to-digital converter for converting the multi-channel signal to corresponding digital signals; and a digital signal processor for
- scaling the digital signals using a series of different coefficient values,
- generating in response to the scaled digital signals a series of first digital signals corresponding to the right channel signal value;
- generating in response to the scaled digital signals a series of second digital signals corresponding to the left channel signal value;
- generating a series of separation signals representing the stereo separation represented by the series of first digital signals and the series of second digital signals;
- storing the coefficient value resulting in the largest stereo separation as a preferred coefficient value; and
- scaling subsequent digital signals according to the preferred coefficient value.

2. The demodulator of claim 1 wherein the multi-channel signal comprises audio baseband signals according to the BTSC standard.

3. The demodulator of claim 1 wherein one of the right channel signal value and left channel signal value comprises a zero value.

4. The demodulator of claim 1 wherein the digital signal processor scales the digital signals by multiplying.

5. The demodulator of claim 1 wherein scaling the digital signals using a series of different coefficient values comprises varying the coefficient values.

6. The demodulator of claim 1 wherein the right channel signal value comprises a first amplitude value and wherein the left channel signal value comprises a second amplitude value.

7. The demodulator of claim 6 wherein the digital signal processor generates a series of separation signals by determining a difference between the first amplitude value and the second amplitude value in each of the series of first digital signals and second digital signals.

8. The demodulator of claim 1 wherein said analog-to-digital converter converts at a sampling rate exceeding 300 kilosamples per second.

9. The demodulator of claim 1 wherein the multi-channel signal comprises a sum of the right channel signal value and the left channel signal value and a difference between the right channel signal value and the left channel signal value, and wherein the digital signal processor's generation of a series of first digital signals corresponding to the right channel signal value and generation of a series of second digital signals corresponding to the left channel signal value comprises:
- decoding the sum of the right channel signal value and the left channel signal value; and
- decoding the difference between the right channel signal value and the left channel signal value.

* * * * *